United States Patent [19]
Matschinsky

[11] Patent Number: 5,445,402
[45] Date of Patent: Aug. 29, 1995

[54] VEHICLE WHEEL SUSPENSION HAVING DISPLACED DAMPER-LINK CORRECTION

[75] Inventor: Wolfgang Matschinsky, Munich, Germany

[73] Assignee: Bayerische Motoren Werke AG, Germany

[21] Appl. No.: 302,984

[22] Filed: Sep. 12, 1994

[30] Foreign Application Priority Data

Sep. 15, 1993 [DE] Germany .................. 43 31 366.3

[51] Int. Cl.⁶ .................. B60G 3/18; B60G 15/06
[52] U.S. Cl. .................. 280/667; 280/673; 280/691; 280/696
[58] Field of Search ............ 280/672, 675, 691, 692, 280/693, 668, 696, 666, 667

[56] References Cited

FOREIGN PATENT DOCUMENTS

| 0312649 | 4/1989 | European Pat. Off. |
| 3005916 | 9/1981 | Germany. |
| 3219685 | 12/1982 | Germany. |
| 4242815 | 6/1993 | Germany. |
| 4207856 | 9/1993 | Germany. |
| 120207 | 6/1987 | Japan .................. 280/666 |

Primary Examiner—Karin L. Tyson
Attorney, Agent, or Firm—Evenson, McKeown, Edwards & Lenahan

[57] ABSTRACT

A vehicle wheel suspension comprises a wheel carrier which supports the wheel and which is connected in the lower area via a transverse link and a pressure strut with the vehicle body. In an articulated manner, a short A-arm is applied to the upper area of the wheel carrier and can be swivelled on a telescopic damper by means of its inner end about a swivelling axis extending approximately in the longitudinal direction of the vehicle. The telescopic damper is surrounded by a coaxial bearing spring constructed as a coil spring and is supported, like the bearing spring, in the upper area of the vehicle body. In order to compensate the bending moments exercised from the wheel load via the upper short A-arm upon the damper, the damper is connected with the transverse link so that it can be swivelled about an axis of rotation which is displaced toward the vehicle center relative to the center axis of the damper.

4 Claims, 2 Drawing Sheets

VEHICLE WHEEL SUSPENSION HAVING DISPLACED DAMPER-LINK CORRECTION

BACKGROUND AND SUMMARY OF THE INVENTION

The invention relates to a vehicle wheel suspension including a wheel carrier supporting a vehicle wheel, a transverse link connecting a lower area of the wheel carrier and a vehicle body, an A-arm connecting an upper area of the wheel carrier to the vehicle body, a damper with a substantially longitudinally extending pivot axis between the damper and the A-arm, said damper supporting at its upper end the vehicle body in an articulated manner and being connected at its lower end to the transverse link so as to be pivotable about a substantially longitudinally extending damper-link connection axis, and a bearing spring surrounding and supported on the damper, said damper having a center axis extending longitudinally of the damper.

Known wheel suspensions of this type (German Patent Documents DE-A-30 05 916 and DE-A-32 19 685) have the principal objective of a low overall height and a reduced space requirement in the forward structure of the vehicle. In this case, the number of linking points to the vehicle body and the type of the introduction of force into the vehicle body are largely the same as in the case of a so-called spring strut type axle in which the telescopic spring strut is fixedly connected with the wheel carrier. In contrast, the steering axis does not have to be inclined as much on top toward the vehicle center as in the case of the spring strut type axles.

In the case of one of the known axles (German Patent Document DE-A-30 05 916), measures were described which have the purpose of preventing a tilting moment with respect to the telescopic spring strut resulting from the wheel load. However, this does not eliminate the tilting moment proportions which are caused by the damper forces.

It is an object of the invention to provide a vehicle wheel suspension of the initially mentioned type in which not only the tilting moment resulting from the spring force or wheel load, but also a transient tilting moment resulting from the damper force is compensated.

According to the invention, this object is achieved in the case of a vehicle wheel suspension of the above-noted type by providing that the damper-link connection axis is displaced toward the vehicle center with respect to the damper center axis. As a result, the working line of the bearing spring and of the damper can coincide in a simple manner and nevertheless not only the tilting moment caused by the spring force, but also the tilting moment exercised by the damper force via the A-arm on the damper, which is a function of the compression speed, possibly also of the bump travel, can be compensated by the tilting moment which is created by the force application point of the transverse link on the damper which force application point is displaced toward the vehicle inside.

Other objects, advantages and novel features of the present invention will become apparent from the following detailed description of the invention when considered in conjunction with the accompanying drawing.

DETAILED DESCRIPTION OF THE PREFERRED EMBODIMENTS

Figure 1:
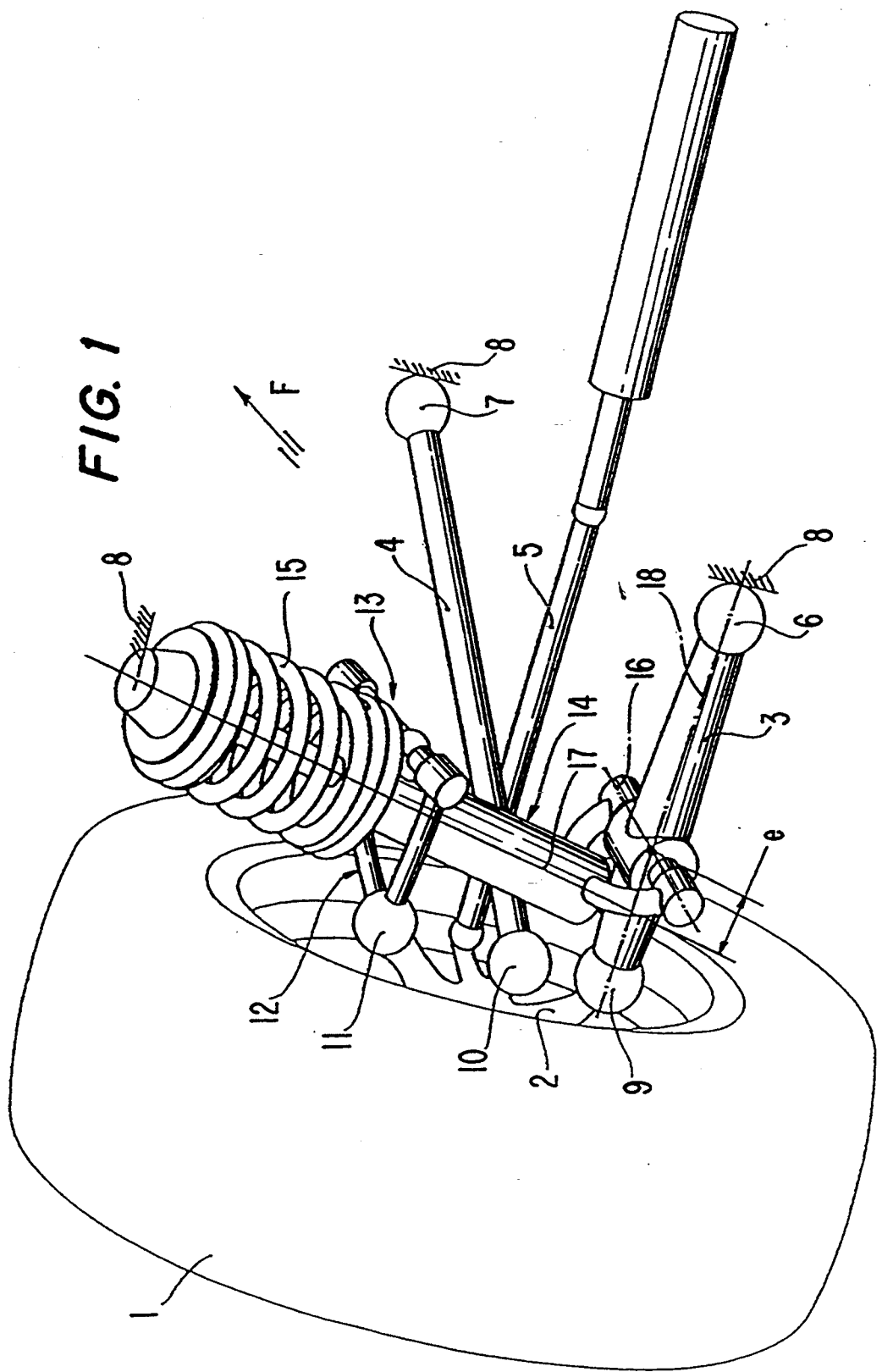
FIG. 1 is a perspective view from the diagonal interior top of the new wheel suspension according to the present invention.
Figure 2:
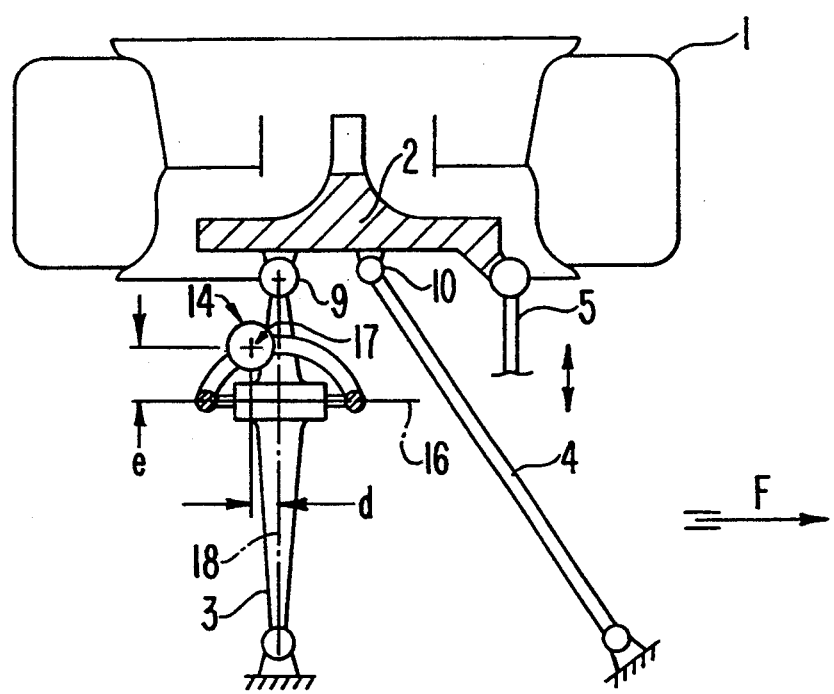
FIG. 2 is a cross-sectional top plan view taken through the wheel axle of the wheel suspension of FIG. 1.

The wheel carrier 2 supporting the wheel 1 is only outlined in the drawing. The drawing illustrates a wheel suspension for a steerable wheel which, however, is not required for the principle according to the invention. In this case, the lower transverse ink is opened up into two individual rod-shaped links, specifically a rod-shaped transverse link arm 3 extending largely transversely to the driving direction F and a strut (link) 4 constituting a tension or pressure rod extending diagonally toward the front on the inside. The interior ends of these links are connected via joints 6 and 7 permitting cardanic movements with the vehicle body 8, which is only outlined, or with an auxiliary frame or subframe. The extreme ends of the above-mentioned links 3 and 4 are applied via ball joints 9 and 10 to the wheel carrier 2. The laterally displaceable steering tie rod 5 for introducing the steering movement is also attached by a ball joint to the wheel carrier 2. By means of their two outer ball joints 9 and 10, the two rod-shaped links 3 and 4 define an "imaginary guiding joint." In its area facing the vehicle center, the A-arm 12 is connected via a corner-stiffened hinge 13 with an axis of rotation extending approximately in the longitudinal direction of the vehicle with the tube of a telescopic damper 14. The tube of the telescopic damper 14 also supports the lower end of the bearing spring 15 which is coaxial with respect to the damper such that the working lines of the bearing spring 15 and of the damper 14 coincide and which, by means of its upper end, is supported in an articulated manner on the only schematically outlined vehicle body 8 via a suitable spring plate. Instead of the bearing spring 15 constructed as a coil spring, a different bearing spring may also be provided, such as a pneumatic or hydropneumatic bearing spring.

On its lower end area, the telescopic damper 14 is connected with the transverse link 3 so that it can be swivelled approximately about a longitudinally extending axis 16 of rotation. In this case, the axis of rotation 16 is displaced toward the vehicle center relative to the center axis 17 of the damper. In this manner, the supporting force composed by the damper 14 from the force of the bearing spring 15 and the damper force generates a bending moment or tilting moment on the lower end of the damper 14. This tilting moment acts in the opposite direction of the tilting moment which is exercised from the wheel load via the wheel carrier 2 essentially about the ball joint 9 and via the A-arm 12 upon the damper 14.

In addition to the just described purely lateral offset e, the center axis 17 of the damper may also be offset d in the driving direction F or in the opposite direction with respect to the longitudinal axis 18 of the rod-shaped transverse link 3. As a result, tilting moments can also be compensated or at least can be compensated to a large extent which arise when, in a purely lateral view, the normal wheel force extends, for example, behind or in front of the ball joint 9 and exercises via the wheel carrier 2 also a longitudinal force component on the A-arm 12. Naturally, in this case, those tilting moment proportions must also be taken into account which arise from the force and the direction of the pressure strut 4 or of the tie rod. 5.

By means of the described wheel suspension, it is possible to completely compensate the tilting moments or jamming forces, which are exercised on the telescopic spring strut, interfere with the response of the suspension and increase the wear, also when the wheel-carrier-side joints of the transverse link, in the described case, also the pressure strut 4, are situated relatively far toward the vehicle center. However, such a position is a prerequisite when, for example, a large brake disk is to be provided next to the rim drop center, that is, outside the wheel center plane.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle wheel suspension system comprising:
   a wheel carrier supporting a vehicle wheel,
   a transverse link connecting a lower area of the wheel carrier and a vehicle body,
   an A-arm connecting an upper area of the wheel carrier to a damper with a substantially horizontally extending pivot axes between the damper and the A-arm,
   said damper supporting at its upper end the vehicle body in an articulated manner, said damper being connected at its lower end to the transverse link so as to be pivotable about a substantially longitudinally extending damper-link connection axis,
   and a bearing spring surrounding and supported on the damper,
   said damper having a center axis extending longitudinally of the damper,
   wherein the damper-link connection axis is displaced toward the vehicle center with respect to the damper center axis.

2. Wheel suspension according to claim 1 with said transverse link being separated into a rod-shaped transverse arm and a tension or pressure rod extending diagonally, wherein the damper is pivotally connected to the rod-shaped transverse arm.

3. A wheel suspension according to claim 2, wherein damper center axis is displaced in a vehicle driving direction with respect to a longitudinal axis of the rod-shaped transverse link.

4. Wheel suspension according to claim 1, wherein working lines of the bearing spring and of the damper coincide.

* * * * *